Oct. 25, 1932.  H. L. BEYER  1,884,535

METHOD OF MAKING GRIDS

Filed May 7, 1931

INVENTOR
Henry L. Beyer.
BY
ATTORNEY

Patented Oct. 25, 1932

1,884,535

UNITED STATES PATENT OFFICE

HENRY L. BEYER, OF NEWARK, NEW JERSEY

METHOD OF MAKING GRIDS

Application filed May 7, 1931. Serial No. 535,719.

This invention relates to methods of making grids for electronic tubes such as used in radio apparatus and the like.

An important element of an electronic tube is the grid, which generally consists of a tube of wire mesh. Heretofore, each grid was made individually by forming a small piece of wire mesh into a cylinder and welding the edges together.

But the method of securing the edges by welding is objectionable in that the welding is unstable and the edges separate, rendering the grid unsatisfactory. Also, it is obvious that the welding method does not enable uniformity, and requires considerable time.

It is therefore, an object of this invention to provide a method of easily and rapidly making grids for electronic tubes and the like.

A further object is the provision of a method of making grids for electronic tubes uniformly in large quantities.

A further object is the provision of a method of making a grid which is stable and will not separate when used in an electronic tube.

These and other advantageous objects, which will later appear, are accomplished by the simple and practical construction and arrangement of parts hereinafter described and exhibited in the accompanying drawing, forming part hereof, and in which.

According to my method, two sheets of wire mesh of the type used for grids, are superimposed and woven at intervals to form a plurality of long tubes, said intervals being equal to the width of a grid when flattened out. The sheets are then cut along the portions where they are woven together so that each long tube is separate from the other; and then each tube is cut into short tubes having the length desired for the grid.

Figure 1:
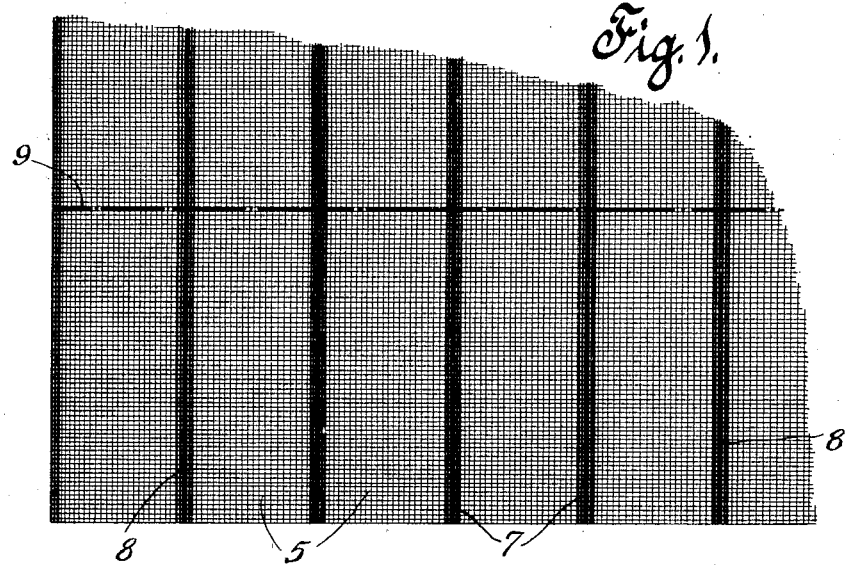
Figure 1 represents a plan view of a pair of superimposed sheets of wire mesh operated upon in accordance with my invention.
Figure 2:
Figure 2 represents an end view of the mesh sheets shown in Figure 1.

Referring to the drawing, in Figure 2 are shown two sheets 5 and 6, of wire mesh which are simultaneously woven. The sheets are united by weaving or other means along the portions 7, which are spaced as shown in Figure 1. The sheets are then cut along lines 8, thus producing a plurality of long flattened tubes which are then cut transversely along lines 9, to produce a plurality of flattened grids, which are subsequently spread open to the shape shown in Figure 3.

It is clear that my method enables the rapid and easy production of grids in large quantities, and as the portions 7 where the sheets are woven together may be accurately spaced, the grids will be uniform.

Figure 3:
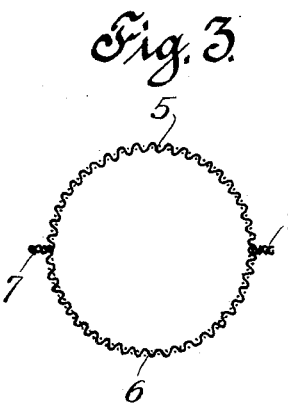
Figure 3 represents an end view of a grid made in accordance with my method.
Figure 4:
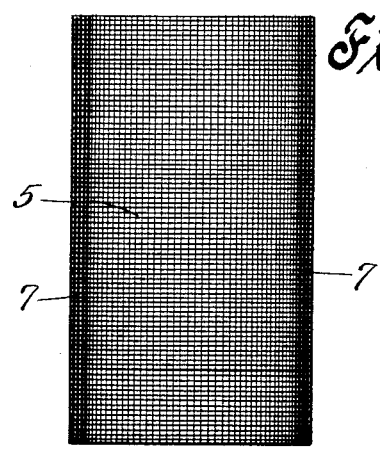
Figure 4 represents a plan view of the grid shown in Figure 3.

Also, the woven portions 7 projecting from each grid, as shown in Figure 3, will not become accidentally separated as frequently happens when the welding method is used. Also, the projecting portion 7 provides convenient means for mounting the grid in a tube.

It will thus be apparent that I have produced an improved grid, the same being provided with re-enforced portions or strengthening ribs these re-enforced portions or strengthening ribs being formed by uniting the longitudinal edges of the wire mesh, thereby imparting to the grid great stability and, in addition thereto, providing convenient, diametrically opposed means for mounting the grid in an electronic tube.

While I have described the sheets as being woven together along the portions 7, it is obvious that they may be united by other suitable means without departing from the spirit of my invention.

Also, my method is not limited to the manufacture of grids for electronic tubes, but is applicable to the making of wire mesh cylinders for use in any situation.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:

1. The method of making grids for electronic tubes and the like, comprising simultaneously weaving two sheets of wire mesh, weaving the sheets together at predetermined intervals, cutting the sheets along the portions where they are woven together to provide a plurality of relatively long tubes, then cutting the tubes into lengths desired for grids, then spreading the tubes into substantially cylindrical shape.

2. The method of making grids for electronic devices, comprising weaving two sheets of wire mesh together at predetermined intervals, cutting the sheets along the woven portions, then cutting the sheets at predetermined intervals transverse to the woven portions to provide a plurality of flattened tubes, then spreading the tubes.

3. The method of making grids for electronic devices, comprising uniting two sheets of wire mesh along parallel spaced lines, cutting the sheets along the lines, and then cutting the sheets into desired lengths transverse to the lines to provide a plurality of flattened tubes, then spreading the tubes.

4. The method of making wire mesh tubes, comprising superimposing two sheets of wire mesh, uniting the sheets along spaced parallel lines, cutting the sheets through the united portions, and then cutting the sheets transversely to the length desired for the wire mesh tube, then spreading the tubes thus formed into substantially cylindrical shapes.

5. In a method of making grids for electronic tubes, the steps of simultaneously weaving two sheets of wire mesh, at the same time weaving the sheets together along spaced parallel lines.

This specification signed this 1st day of May, 1931.

HENRY L. BEYER.